INVENTORS
FRANK W. BROOKS, JR.
CLAIBORNE A. DUVAL, JR.
BY
AGENT

United States Patent Office 2,770,581
Patented Nov. 13, 1956

2,770,581

STABILIZATION OF FUEL OIL

Frank W. Brooks, Jr., and Claiborne A. Duval, Jr., Beaumont, Tex., assignors to Socony Mobil Oil Company, Inc., a corporation of New York Application April 27, 1953, Serial No. 351,168

2 Claims. (Cl. 196—41)

The present invention relates to the stabilization of fuel oils and, more particularly, to a method for stabilizing fuel oils with respect to color and sedimentation employing aqueous solutions of alkali metal hydroxide in which the constituents of the fuel oil which appear to be the source, per se, or potentially, of the instability are separated from the alkali metal hydroxide solution by gravity.

Many distillate fuel oils of the type used both in domestic, i. e., home burners or industrial burners deteriorate in storage either with respect to color or sedimentation or both. Several methods of treatment are commonly known to increase the stability of these fuel oils although no completely satisfactory explanation of the cause of the instability nor of the mechanism whereby the fuel oil is stabilized has been advanced and accepted by those investigating this problem. Three commonly employed methods for stabilizing these fuel oils are acid treating, caustic treating and solvent treating.

Figure 1:
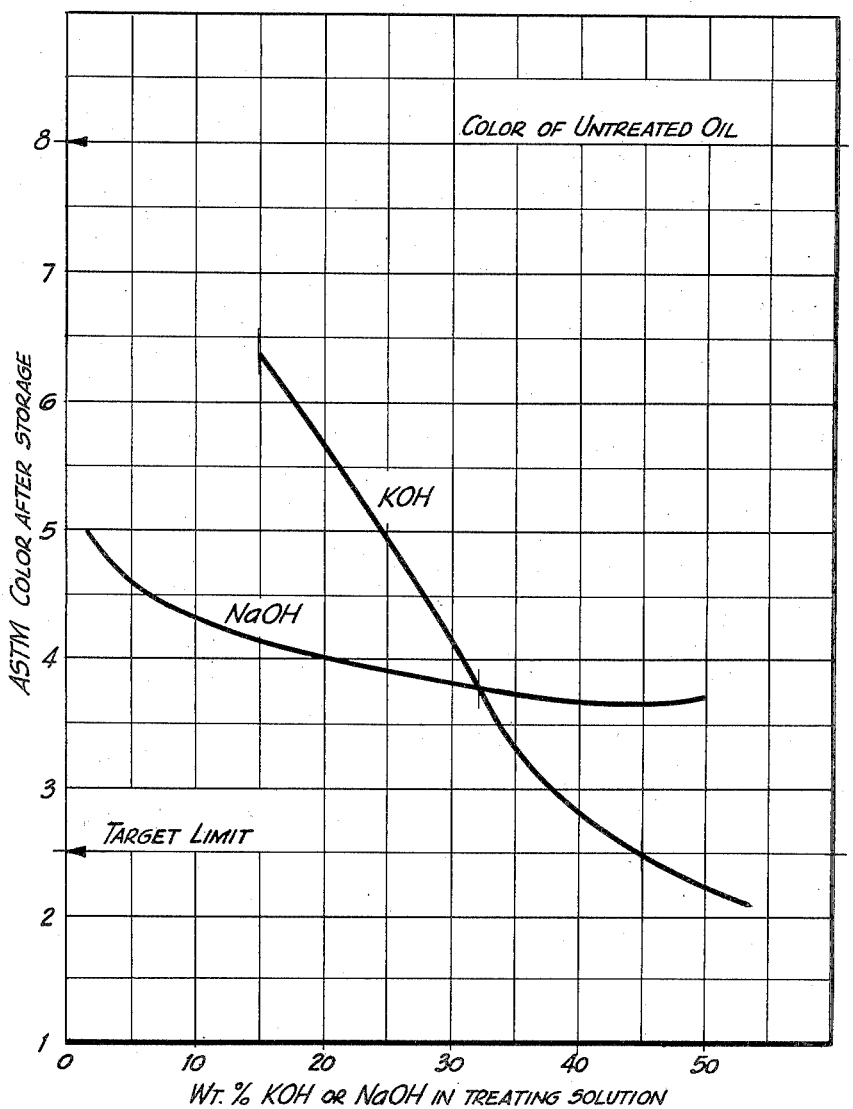
Figure 2:
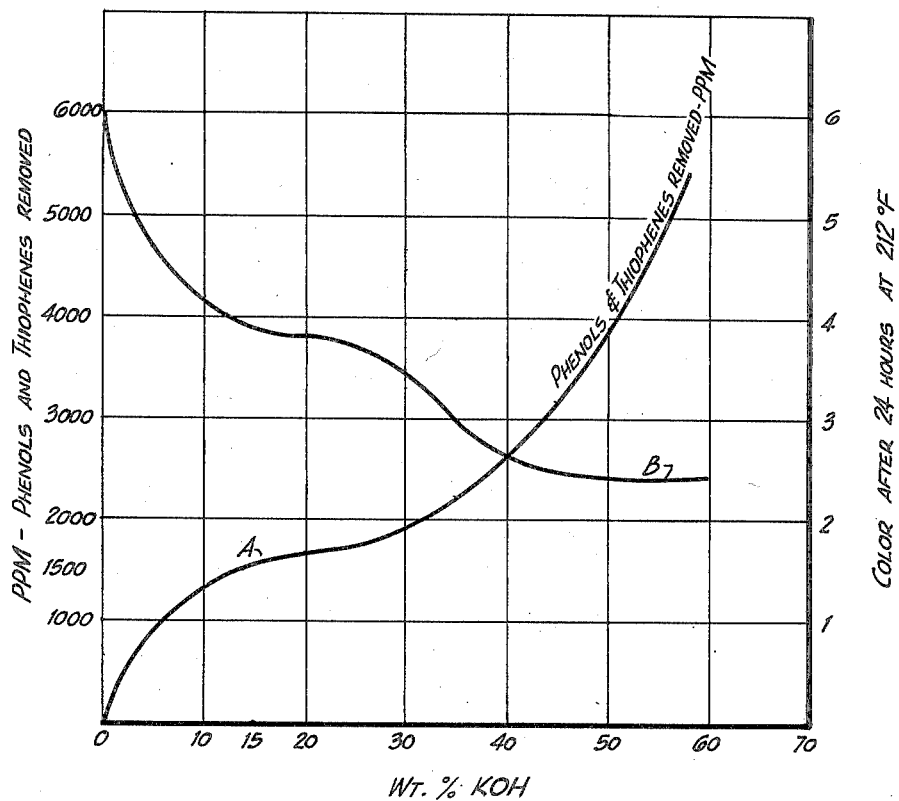
Figure 3:
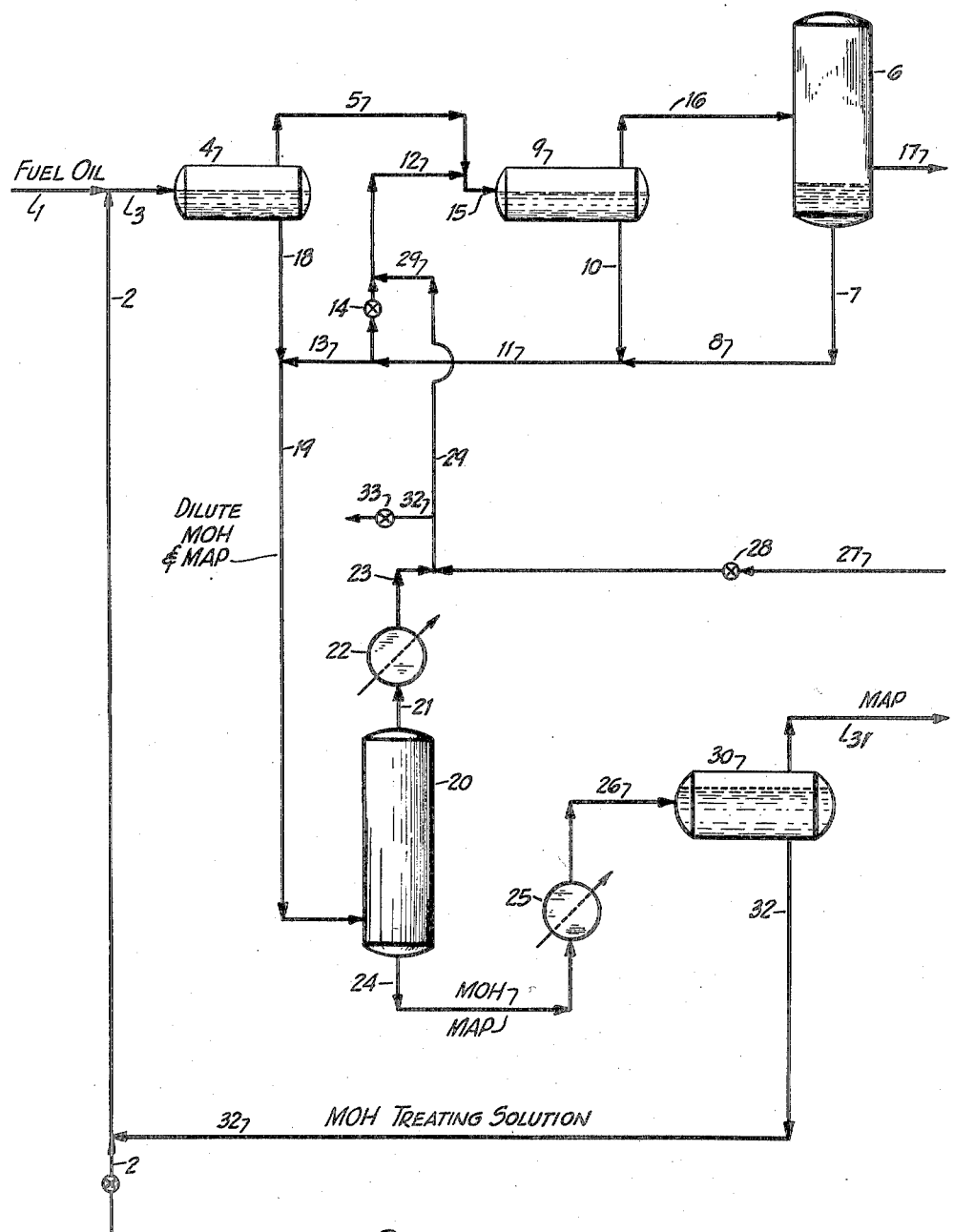
Figure 4:
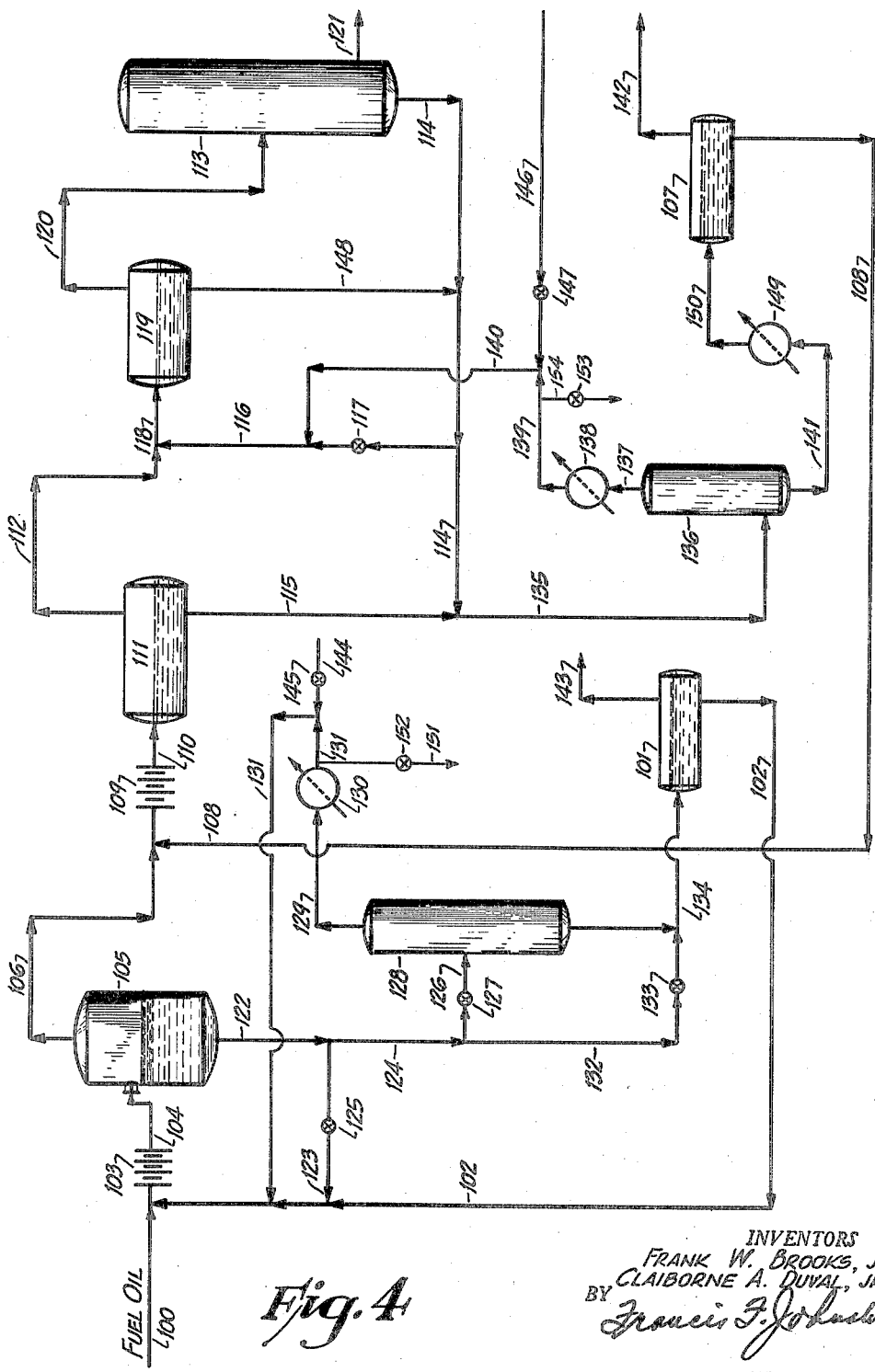

In the stabilization of such fuel oils by caustic treatment it has been practice to contact the oil with aqueous solutions of alkali metal hydroxide followed by separation of the treated fuel oil from the aqueous solution. Thereafter the treated oil is water-washed to remove entrained alkali and the wash water separated from the treated oil. In general, the aforesaid process is a batch process and the alkali metal hydroxide solution is discarded. After the alkali metal hydroxide solution has been used to treat several batches of oil, it likewise is discarded. Consequently, the art, for economic reasons, has been limited to the use of the cheaper sodium hydroxide rather than the costlier potassium hydroxide. On the other hand, as clearly demonstrated in Figure 1 of the drawings (discussed hereinafter), potassium hydroxide solutions are more effective to produce a color-stable oil of required color than sodium hydroxide solutions. Accordingly, it is necessary to provide for a means whereby potassium hydroxide solutions can be used at economically attractive levels. This end can be achieved by means of a suitable method of regenerating the fouled potash solutions. It has now been discovered that aqueous solutions of alkali metal hydroxides, i. e., NaOH and KOH, can be regenerated for re-use and that certain advantages can be gained by the use of a combination of treatment with caustic soda followed by treatment with caustic potash. Accordingly, the present invention has among its objects provision of a means for stabilizing fuel oils with respect to color and/or sedimentation employing aqueous solutions of caustic soda or of caustic potash or of caustic soda followed by caustic potash in which the fouled solutions are regenerated. These and other objects will become apparent to those skilled in the art from the following discussion of the present invention taken in conjunction with the drawings in which Figure 1 is a graph showing the relation between the color of an oil treated with 20 volume percent of treating solutions containing various quantities of caustic soda or caustic potash after storage at 100° F. in a glass bottle for two months;

Figure 2 is a graph showing the relation between the color of an oil treated at an oil-to-aqueous potash solution ratio of 5:1 employing potash solutions having various concentrations of potash after storage in a glass bottle at 212° F. for 24 hours. (It has been found that storage at 212° F. for 24 hours is comparable with storage at 100° F. for two months as an indication of the stability of treated oil.);

Figure 3 is a highly schematic flow-sheet illustrative of a method for treating fuel oil with an aqueous solution of alkali metal hydroxide to stabilize the fuel oil with respect to color and/or sediment wherein the fouled aqueous alkali metal hydroxide solution is regenerated; and Figure 4 is a highly schematic flow-sheet illustrative of a method for treating fuel oil first with an aqueous solution of caustic soda and then with an aqueous solution of caustic potash to stabilize the fuel oil with respect to color and/or sediment wherein both fouled aqueous alkali metal hydroxide solutions are regenerated.

It has been found that a satisfactorily stabilized oil is one which has an A.S.T.M. color not darker than 2½ and a sediment not in excess of 2 milligrams per 100 milliliters after storage in a glass bottle at 100° F. for two months. A more highly accelerated test giving comparable results is one in which the treated oil is stored for 24 hours at 212° F. in a glass bottle. The data plotted in Figure 1 are those obtained by treating a fuel oil with aqueous solutions of caustic soda or caustic potash at an oil-to-solution ratio of 5:1, separating the treated oil from the fouled aqueous solution, water-washing the treated oil, storing the treated oil in glass bottles for two months at 100° F. and determining the color at the end of the storage period.

Upon reference to Figure 1, two facts are immediately apparent; (1) that for a given increment in the concentration of alkali metal hydroxide at the same ratio of oil-to-alkali metal hydroxide solution caustic potash is more effective than caustic soda in removing those components of the oil which, per se or potentially, are the source of the oil darkening bodies, (2) that solutions containing 35 weight percent and more of caustic potash are superior to solutions containing 35 weight percent and more of caustic soda, and (3) that while the effectiveness of solutions containing 35 weight percent or more of caustic potash to remove color bodies increases, the effectiveness of solutions containing more than 35 weight percent of caustic soda is approximately the same as that of a solution containing about 30 to 35 weight percent caustic soda. In other words, aqueous treating solution containing approximately 35 weight percent caustic potash are superior to aqueous treating solutions containing 50 weight percent caustic soda when used at the same ratio of oil-to-treating solution. This indicates that strong, i. e., containing 35 weight percent or more, caustic potash solutions extract a greater quantity and/or a different color darkening material than caustic soda solutions of comparable concentration. Accordingly, for economic reasons when treating unstable fuel oils it is advantageous to use as a first treating solution an aqueous solution containing about 15 to about 35 weight percent caustic soda at an oil-to-solution ratio of about 4:1 to about 20:1 to separate the treated oil from the aqueous caustic soda solution and in a second operation treat the partially treated oil with an aqueous caustic potash solution containing at least about 35 weight percent caustic potash at an oil-to-solution ratio of about 5:1 to about 200:1.

Referring to Figure 2, an unstable fuel oil distillate from a catalytic cracking conversion was treated at a volumetric oil-to-solution ratio of 5:1. The color stability was determined by storage in glass bottles at 212° F. for 24 hours. The data thus obtained are tabulated hereinafter and plotted in Figure 2.

Table I

| Weight Percent KOH in Treating Solution | Color of Oil After Treat | Color of oil after 24 hrs. at 212° F.[1] | P. p. m. of acidic material removed from oil |
|---|---|---|---|
| None | 1½ | 6— | None |
| 7.6 | 2— | 4½— | 1,148 |
| 16.4 | 2— | 4— | 1,607 |
| 21.8 | 2— | 4— | 1,722 |
| 24.4 | 2— | 4— | 1,837 |
| 27.2 | 2— | 3½ | 1,902 |
| 29.3 | 2— | 4— | 1,980 |
| 31.9 | 2— | 3— | 2,055 |
| 37.6 | 2— | 3 | 2,400 |
| 44.0 | 2— | 2½ | 2,975 |
| 50.5 | 2— | 2½ | 4,133 |
| 56.6 | 2— | 3— | 5,229 |

[1]—=lighter than the numerical value given; +=darker than the numerical value given.

Analysis of the material extracted from fuel oil indicates that the major proportion of the acidic materials extracted by both 5 weight aqueous caustic soda and 42.6 weight percent aqueous caustic potash consists of phenols and thiophenols. Some of the acidic material extracted by strong aqueous caustic potash solutions are insoluble in dilute caustic potash solutions.

The distribution of the compounds extracted by 5 weight percent caustic soda and 43° Bé. (42 weight percent) caustic potash is given in Table II.

Table II

| Soluble in 5 Wt. Percent KOH | Parts per Million | | |
|---|---|---|---|
|  | Extracted by 5 Wt. Percent NaOH | Extracted by 42 Wt. Percent KOH | Difference |
| Aryl Mercaptans: | | | |
| Methyl and polymethyl-thiophenols | 145 | 348 | 203 |
| Polynuclear mercaptans | 36 | 87 | 51 |
| Phenols: | | | |
| Xylenols | 102 | 244 | 142 |
| Tri and tetramethylphenols | } 707 | } 1,696 | } 989 |
| Arylhydroxy indane and tetraline derivatives | | | |
| Alpha-Naphthol | 6 | 15 | 9 |
| Beta-Naphthol | 51 | 123 | 72 |
| 4-Hydroxybiphenol | 51 | 123 | 72 |
| Polynuclearphenols | 102 | 244 | 142 |
| Insoluble in 5 Wt. Percent KOH: | | | |
| Alkanes |  | 112 | 112 |
| Thiophenols |  | 67 | 67 |
| Phenols |  | 639 | 639 |
| Other Hydrocarbons |  | 302 | 302 |
| Total | 1,200 | 4,000 | 2,800 |

Illustrative of the application of the data presented hereinbefore to the treatment of fuel oil unstable with respect to color and/or sediment in a method wherein the alkali metal hydroxide treating solution is regenerated, is the method depicted in a highly schematic manner in the flow-sheet, Figure 3.

A fuel oil unstable with respect to color and/or sediment, i. e., a fuel oil which after 24 hours' storage at 212° F. or after 2 months' storage at 100° F. in glass bottles has a color more than 2 units on the A. S. T. M. color scale greater than immediately after treating, is pumped from a source not shown through line 1 to line 3. An aqueous alkali metal hydroxide solution having a concentration such that oil treated therewith after 2 months' storage in a glass bottle at 100° F. or 24 hours' storage in a glass bottle at 212° F. has a color not darker than 2½ and a sediment content not in excess of 2 milligrams per 100 milliliters, and said aqueous alkali metal hydroxide solution having a maximum concentration which can be used without causing difficulty in the extraction system because of crystallization or emulsification and preferably about 45 to about 55 weight percent alkali metal hydroxide is introduced into line 3 from line 2 in the ratio of about 0.2 to about 0.05 volume of alkali metal hydroxide solution to each volume of oil to be treated. The oil to be treated and aqueous alkali metal hydroxide treating solution are intimately mixed as by means of an orifice mixer, an agitator or the like and flows to settler 4. It will be understood by those skilled in the art that while only one mixing and settling stage is shown, mixing and settling can take place in a plurality of stages as in a counter-current extracting system.

In settler 4 the fouled aqueous extracting solution is drawn off through line 18 while the treated oil leaves settler 4 through line 5. The path of the treated oil will be followed first and then the course of the fouled treating solution through regeneration thereof and return to the treating section.

The treated oil flows through line 5 to line 15 where wash-water flowing from coalescer 6 through lines 7, 8, 11 and 12 under control of valve 14 is mixed with the treated oil to dissolve and to remove alkali metal hydroxide with which the oil is contaminated. Orifice mixers or other mixers of suitable type can be interposed between line 15 and settler 9 wherein the wash-water is separated from the treated oil.

In settler 9 the water-washed, treated oil rises to form an upper layer and flows therefrom through line 16 to coalescer 6. The wash-water leaves settler 9 through pipe 10 to mix with the wash-water separated in coalescer 6 and flowing therefrom through pipes 7 and 8 to pipe 11.

In coalescer 6 the droplets of wash-water entrained in the water-washed, treated oil agglomerate and settle to the bottom of the coalescer while the water-washed, treated fuel oil, stable with respect to color and/or sediment, flows from coalescer 6 through line 17 to storage and/or distribution.

Returning now to settler 4. The fouled aqueous treating solution flows therefrom through pipe 18 to pipe 19. In pipe 19 a portion of the water from coalescer 6 and settler 9 containing alkali metal hydroxide flowing therefrom through pipes 7, 8, 10, 11 and 13 is mixed with the fouled aqueous treating solution. The diluted treating solution flows through pipe 19 to dehydrator 20 of any suitable design and construction such as a simple still wherein the fouled treating solution is concentrated to a degree such that the acidic material extracted from the treated oil now in the form of alkali metal salts forms an upper layer when cooled to about 100 to 150° F. and settled. The aforesaid salt layer will separate from the aqueous alkali metal hydroxide solution at about 100 to about 175° F. when the lower layer contains at least 30 weight percent caustic potash or at least 30 weight percent caustic soda.

The water evaporated from the fouled dilute treating solution passes overhead from dehydrator 20 through pipe 21 to condenser 22 and thence as condensate through line 23 to line 29 and thence to line 12 to be used to water-wash the treated oil in line 15. A portion of the condensate can be discharged from the system through line 32 under control of valve 33. From time to time, as operation requires, fresh water can be introduced into the system from a source not shown through pipe 27 under control of valve 28.

Returning now to the fouled concentrated treating solution in dehydrator 20. The fouled concentrated treating solution flows from dehydrator 20 through pipe 24 to cooler 25 and thence through pipe 26 to settler 30.

In settler 30 the alkali metal salts of acidic material extracted from the treated oil form an upper layer and are drawn off through pipe 31 to a recovery system or to waste. As a result of the separation of the alkali metal salts of the acidic material, the aqueous treating solution is regenerated and ready for re-use in extracting components of fuel oil which, per se or potentially, are the source of the instability of the oil.

The amount of alkali metal hydroxide withdrawn from the system through pipe 31 is not of economic importance relative to the total amount of alkali metal hydroxide employed since the salt layer in settler 30 usually represents about 1 to about 10 percent of the total alkali metal hydroxide employed per unit of time.

The use of a combination of caustic soda and caustic potash in treating fuel oil to stabilize the same with respect to color and/or sediment is illustrated in a highly schematic manner in Figure 4. Those skilled in the art will understand that, although only one mixing and one settling stage is illustrated in each of the caustic soda and caustic potash treatments, a plurality of such stages in one or both treatments can be used.

Oil to be stabilized with respect to color and/or sediment flows from a source not shown through line 100. Aqueous caustic soda solution of suitable strength flowing from settler 101 through pipe 102 is introduced into line 100 and the mixture flows through orifice mixer 103 or other suitable mixer providing intimate contact of the oil and aqueous treating solution to line 104. From line 104 the mixture flows to settler 105.

In settler 105 the partially treated oil forms the upper layer and flows therefrom through line 106. The fouled aqueous caustic soda solution forms the lower layer and flows from settler 105 through pipe 122 under control of valve 125. All or a part of the fouled caustic soda solution can be directed along pipe 123 to pipe 102 to contact further amounts of oil. Generally, a major portion or all of the fouled treating solution flows from pipe 122 to pipe 124 and then, dependent upon the concentration of the caustic soda, flows wholly or in part through pipe 126 under control of valve 127 to dehydrator 128 or wholly or in part flows through line 132 under control of valve 133 to settler 101. Direction of flow to dehydrator 128 is dependent upon whether or not the concentration of free caustic soda in the fouled treating solution is high enough to provide reasonably clean separation as an upper layer of the sodium salts of the acidic material extracted from the treated oil. A reasonably clean separation at about 100° to about 150° F. is obtained when the free caustic soda is at least 30 weight percent. At lower separation temperatures lower concentrations are effective and at higher separation temperatures concentrations higher than 30 weight percent are required in settler 101.

When the concentration of free alkali in the fouled caustic soda treating solution is less than that at which reasonably clean, i. e., industrially practical, separation can be obtained in settler 101 at least sufficient of the fouled treating solution is directed to dehydrator 128 so that when dehydrated and returned to pipe 134, the concentration of free caustic in the contents of pipe 134 will be such that reasonably clean separation is obtained in settler 101 between the caustic soda salts of the acidic material extracted from the oil and the aqueous regenerated caustic soda treating solution obtained thereby.

Accordingly, the contents of pipe 134 has a concentration of free caustic soda such that an upper layer of the sodium salts of the extracted acidic material and a lower layer of an aqueous caustic soda treating solution form in settler 101. The mixture flows to settler 101 where the upper layer of sodium salts flows therefrom through line 143 to recovery or waste, while the regenerated aqueous caustic soda solution flows from settler 101 through line 102 to line 103.

Returning to dehydrator 128. The water evaporated from the fouled caustic soda treating solution is taken overhead through pipe 129 to condenser 130 from which the condensate flows through pipe 131 back to pipe 102. From time to time, as operation requires, fresh water or fresh caustic soda treating solution is introduced into pipe 131 from a source not shown through pipe 144 under control of valve 145. When desirable or necessary, a portion of the condensate is discharged from the system through line 151 under control of valve 152.

Returning now to settler 105. The partially treated oil which forms the upper layer therein flows therefrom through line 106. Aqueous caustic potash solution flowing from settler 107 through pipe 108 is mixed therewith and the mixture passed through a mixer of suitable type 109 such as an orifice mixer. The intimately mixed oil and caustic potash solution flows through line 110 to settler 111 wherein the treated oil forms the upper layer. The treated oil flows from settler 111 through line 112 to line 118 where it is contacted with wash-water flowing from coalescer 113 through pipes 114 and 116 under control of valve 117. The mixture of treated oil and wash-water flows through pipe 118 to settler 119 where the treated oil forms the upper layer and the wash-water the lower layer.

The treated oil flows from settler 119 through line 120 to coalescer 113 where entrained wash-water settles out and is withdrawn through pipe 114 while the water-washed treated oil stabilized with respect to color and/or sediment flows to storage and/or distribution through line 121.

Returning to settler 111. The fouled aqueous caustic potash treating solution which forms the lower layer therein flows therefrom through pipe 115 to pipe 135 where wash-water containing caustic potash flowing through pipes 148 from settler 119 and from coalescer 113 through pipe 114 is mixed with the fouled aqueous caustic potash treating solution.

The diluted fouled caustic potash treating solution in pipe 135 flows to dehydrator 136 of any suitable type such as an evaporator where the fouled solution is evaporated to a concentration such that when cooled to about 100° to about 150° F. the potassium salts of the acidic material extracted from the treated oil form an upper layer. Such separation occurs when the concentration of free caustic potash is at least 30 weight percent. Lower concentrations are effective at lower separation temperatures.

The concentrated fouled aqueous caustic potash treating solution flows from dehydrator 136 through pipe 141 to cooler 149 where the concentrated fouled caustic potash solution is cooled to a temperature such that at the concentration of free caustic potash existing in line 141, the potassium salts of the acidic material extracted from the treated oil are insoluble in the aqueous caustic potash solution. When the concentration of free caustic is about 50 weight percent caustic potash (50° Bé.), the mixture in line 141 is cooled in condenser 149 to about 100° to about 150° F. The cooled concentrated fouled aqueous caustic potash treating solution comprising a mixture of aqueous caustic potash solution and solution-insoluble potash salts of acidic material extracted from the treated oil flows through pipe 150 to settler 107 wherein the solution-insoluble potash salts form the upper layer while the regenerated aqueous caustic potash solution substantially devoid of acidic material, coloring bodies, etc., forms the lower layer.

The upper layer of potash salts of the acidic material extracted from the treated oil flows from settler 107 through line 142 to a recovery system wherein the phenols and thiophenols, etc., can be recovered or to waste.

The regenerated aqueous caustic potash solution substantially devoid of material extracted from the treated oil flows from settler 107 through pipe 108 to pipe 106 to be mixed with partially treated fuel oil flowing therethrough from settler 105.

In general, extracting or treating temperatures are about 125° to about 175° F. and aqueous alkali metal hydroxide solutions containing about 15 to about 55 weight percent alkali metal hydroxide are used to stabilize the fuel oil with respect to color and/or sediment. However, it is to be noted that when the oil has satisfactory stability with respect to color but is unstable with respect to sediment, concentrations of caustic soda as low as 10 weight percent can be used. Thus, caustic soda treating solutions containing 10 to 55 weight percent caustic soda can be used alone or in combination with caustic potash treating solutions containing about 30 to about 55 weight percent caustic potash. The oil-totreating solution volumetric ratio can be about 5:1 to about 20:1. The separation temperatures, i. e., temperatures at which the alkali metal salts of the extracted acidic material separate from the aqueous alkali metal hydroxide solution vary with the concentration of free alkali metal hydroxide and are about 100° to about 175° F. for solutions containing at least about 30 weight percent alkali metal hydroxide; the higher the concentration of free alkali metal hydroxide, the lower the temperature at which the aforesaid alkali metal hydroxide salts separate from the aqueous alkali metal hydroxide solution.

As is known to those skilled in the art, the stability of fuel oils with respect to color and/or sediment varies. A fuel oil such as that for which data have been presented hereinbefore is one which in the untreated state upon storage in a glass bottle for 2 months at 100° F. has a color 8 on the A. S. T. M. scale and a sediment of about 10 milliliters per 100 milliliters. Such an oil can be stabilized with respect to color and sediment by treatment with about 45 weight percent aqueous alkali metal hydroxide solution at an oil to solution ratio of about 100 volumes to 1 volume, preferably about 5:1 to about 20:1. Less stable oils require a greater volume of alkali metal hydroxide solution of the same concentration of a substantially equal volume of solution of greater strength. More stable oils can be successfully treated with a smaller volume of solution of substantially the same concentration or a substantially equal volume of solution of lower concentration.

Those skilled in the art will understand that it is preferred to use treating solutions having a concentration of alkali metal hydroxide such that a minimum amount of evaporation is required to produce a solution from which the solution-insoluble salts of the extracted material will separate. In other words, the separation temperature and extracting temperatures are selected to require a minimum of dehydration of the fouled treating solution and minimum temperature rise in the regenerated solution prior to use in the extraction portion of the system. In other words, the heat requirements of the entire system are kept at an economically practical balance.

We claim:

1. A method of producing fuel oil having an A. S. T. M. color not darker than 3½ after storage in a glass bottle at 100° F. for two months, which comprises intimately mixing a fuel oil having an A. S. T. M. color darker than 3½ with a first aqueous solution containing as its sole essential solute about 20 to about 55 weight percent sodium hydroxide at an oil-to-sodium hydroxide solution ratio of about 4:1 to about 20:1, separating partially treated oil from fouled first aqueous sodium hydroxide solution containing sodium salts of material extracted from said oil, intimately mixing said partially treated oil with a second aqueous solution containing as its sole essential solute about 35 to about 55 weight percent potassium hydroxide at an oil-to-potassium hydroxide solution ratio of about 5:1 to about 200:1, separating treated oil from fouled second aqueous potassium hydroxide solution containing potassium salts of material extracted from said partially treated oil, water-washing said treated oil, separating said water-washed treated oil from wash water, removing entrained wash water from said treated oil to obtain a treated oil having an A. S. T. M. color not darker than 3½ after storage in a glass bottle at 100° F. for two months.

2. A method for producing fuel oil having an A. S. T. M. color not darker than 3½ after storage in a glass bottle at 100° F. for two months, which comprises intimately mixing a fuel oil having an A. S. T. M. color darker than 3½ with a first aqueous solution containing as its sole essential solute about 20 to about 55 weight percent sodium hydroxide at an oil-to-sodium hydroxide solution ratio of about 4:1 to about 20:1, separating partially treated oil from fouled first aqueous sodium hydroxide solution containing sodium salts of material extracted from said oil, intimately mixing said partially treated oil with a second aqueous solution containing as its sole essential solute about 35 to about 55 weight percent potassium hydroxide at an oil-to-potassium hydroxide solution ratio of about 5:1 to about 200:1, separating treated oil from fouled second aqueous potassium hydroxide solution containing potassium salts of material extracted from said partially treated oil, water-washing said treated oil, separating washed treated oil from wash water containing alkali metal hydroxide, removing entrained water from washed treated oil to obtain oil having an A. S. T. M. color not darker than 3½ after storage in a glass bottle at 100° F. for two months, adjusting at least one of temperature and concentration of sodium hydroxide of said fouled first aqueous solution to produce a fouled first aqueous solution in which said sodium salts are substantially insoluble, separating said solution-insoluble sodium salts from the aqueous medium to obtain a regenerated first aqueous solution having as its sole essential solute about 30 to about 55 weight percent sodium hydroxide, contacting additional quantities of fuel oil with said regenerated first aqueous solution, mixing said separated wash water and said removed entrained wash water with said separated fouled second aqueous solution, adjusting at least one of temperature and concentration of potassium hydroxide of said fouled second aqueous solution to produce a fouled second aqueous solution in which said potassium salts are substantially insoluble, separating said solution-insoluble potassium salts from the aqueous medium to obtain a regenerated second aqueous solution having as its sole essential solute about 45 to about 55 weight percent potassium hydroxide, and contacting additional amounts of partially treated oil with said regenerated second aqueous solution.

References Cited in the file of this patent

UNITED STATES PATENTS

| | | |
|---|---|---|
| 1,761,328 | Chappell | June 3, 1930 |
| 1,796,621 | Ramage | Mar. 17, 1931 |
| 2,174,174 | Greensfelder et al. | Sept. 6, 1939 |
| 2,556,438 | Parker | June 12, 1951 |
| 2,591,946 | Krause et al. | Apr. 8, 1952 |